United States Patent [19]

Emmons et al.

[11] 4,299,761

[45] * Nov. 10, 1981

[54] POLYMER CONCRETE COMPOSITIONS, METHODS OF APPLICATION THEREOF, AND POLYMERIZED PRODUCTS THEREOF

[75] Inventors: William D. Emmons, Huntingdon Valley; Kayson Nyi, Sellersville, both of Pa.

[73] Assignee: Rohm and Haas Company, Philadelphia, Pa.

[ * ] Notice: The portion of the term of this patent subsequent to Jun. 27, 1995, has been disclaimed.

[21] Appl. No.: 21,660

[22] Filed: Mar. 19, 1979

[51] Int. Cl.³ .................................................. C08J 3/20
[52] U.S. Cl. .................................... 260/42.53; 428/136
[58] Field of Search ..................... 526/282; 260/42.53; 427/136, 407.1

[56] References Cited

U.S. PATENT DOCUMENTS

| | | | |
|---|---|---|---|
| 2,414,089 | 1/1947 | Bruson | 427/134 |
| 4,071,489 | 1/1978 | Emmons et al. | 260/22 CB |
| 4,097,677 | 6/1978 | Emmons et al. | 560/220 |
| 4,141,868 | 2/1979 | Emmons et al. | 260/23 XA X |

FOREIGN PATENT DOCUMENTS

| | | | |
|---|---|---|---|
| 1234027 | 2/1967 | Fed. Rep. of Germany . | |
| 46/42365 | 12/1971 | Japan | 526/282 |

OTHER PUBLICATIONS

Chemical Abstracts, Por. 75:153046t, (1971).

*Primary Examiner*—Lewis T. Jacobs
*Attorney, Agent, or Firm*—Lester E. Johnson

[57] ABSTRACT

Polymer concrete compositions of essentially anhydrous character comprising an inert, inorganic particulate or granular material, such as sand, crushed stone or rock, and mixtures thereof, mixed with a monomeric dicyclopentenyloxylalkyl acrylate or methacrylate or mixture thereof to form a paste or slurry suitable upon addition thereto of a polyvalent metal salt drier or siccative, preferably with an organic peroxide free radical initiator to be used to form (or to patch previously formed or laid) concrete floors and road pavements are disclosed.

9 Claims, No Drawings

POLYMER CONCRETE COMPOSITIONS, METHODS OF APPLICATION THEREOF, AND POLYMERIZED PRODUCTS THEREOF

BACKGROUND OF THE INVENTION

Copending U.S. application Ser. No. 687,856, filed May 19, 1976, and copending U.S. Ser. No. 968,706, filed 12/12/78, which is in turn a continuation-in-part of Ser. No. 687,856, and copending U.S. Ser. No. 3,055, filed 1/12/79, which is in turn a continuation of Ser. No. 687,856, in the hands of a common assignee, discloses the production of a polymer concrete, hereinafter sometimes referred to by the term "PC", using dicyclopentenyl acrylate or methacrylate as a binder for an aggregate material, such as sand and crushed stone. These two monomers used separately or as a mixture thereof, have been generically referred to by the designation DCP(M)A, the individual monomers being specifically designated DCPA and DCPMA, respectively, in the application referred to.

While the DCP(M)A mentioned has been found quite useful in the application mentioned, nevertheless, DCP(M)A, in spite of low volatility, has an odor that is quite characteristic, pervasive, persistent, and objectionable. The odor is a serious drawback especially when the PC is applied indoors for laying or patching industrial floors or even when it is applied outdoors for laying or patching concrete patios, parking lots, roads, ship decks or bridge decks in the sun, especially in the summertime. Furthermore, the use of DCP(M)A tends to produce extremely hard bonds which may require considerable plasticizer to prevent fracture when the product is one that may be subjected to severe impact in use, a not unusual situation in the case of industrial floors, ship decks, and highways.

DESCRIPTION OF THE INVENTION

According to the present invention, an essentially anhydrous "polymer concrete" (PC) composition is provided which avoids the obnoxius odor of the DCP(M)A esters and reduces or eliminates the need for plasticizers.

The present invention provides a polymer concrete composition comprising an essentially anhydrous slurry of (a) an inert inorganic particulate aggregate having a void fraction of less than 0.37 in (b) dicyclopentenyloxyethyl acrylate or dicyclopentenyloxyethyl methacrylate or a mixture thereof, the slurry containing dissolved therein a curing catalyst consisting essentially of (c) an organic peroxide and/or (d) a polyvalent metal salt drier, the proportion of component (b) being such as to make the composition of workable, especially trowellable, consistency, the amount of (c), when present, being in the range of about 0.1 to 3 weight percent, and the amount of (d), when present, being in the range of about 0.0005 to about 2 weight percent, the ranges of (c) and (d) both being based on the weight of component (b).

As compared to DCP(M)A, the dicyclopentenyloxyethyl acrylate and methacrylate are liquid reactive monomers of such low volatility that they have no flash point and practically no odor so that PC compositions containing them can be spread out, as by trowelling, to form or patch a floor indoors or to form or patch a concrete pavement on a road or highway even in hot weather, without developing obnoxious odor at the work site.

For the purpose of simplifying the description hereinafter, dicyclopentenyloxyethyl acrylate may be referred to by the acronym, DCPEA; the corresponding methacrylate by DCPEMA; and the expression DCPE(M)A may be used as a generic term to embrace either the acrylate or methacrylate or a mixture thereof. These liquid monomeric esters may be made in various ways, among which those methods disclosed in our prior U.S. Pat. No. 4,097,677 June 27, 1978, are suitable. See examples 1 and 2 therein.

In general, the aggregate is a particulate or granular material ranging in particle size from about 100 microns to about 2-mesh (U.S. wire screen standard). Generally, a mixture of different-sized graded aggregates is used, especially when an aggregate material having a large size in the upper part of the range mentioned is one component of the aggregate. Such large-sized aggregate is mixed with smaller sizes of aggregate to minimize void volume, especially to achieve void volumes of less than 0.37, optimally less than 0.3, to thereby reduce the amount of liquid monomer DCPE(M)A required to fill the voids and thereby minimize the overall polymerization shrinkage and cost of the monomer component.

The aggregate material used herein may be any inert inorganic substance that is resistant to such organic and inorganic acids, salts, and alkalis as may be encountered in common industrial plants, e.g., hydrochloric acid, sulfuric acid, nitric acid, sulfonic acid, phosphoric acid, acetic acid, formic acid; sodium, potassium, calcium, and magnesium salts, e.g., the chlorides, sulfates; and alkali metal and alkaline earth metal hydroxides. Examples of suitable aggregates include sand, silica flour, crushed rocks or stones of quartz, granite, feldspar, gneiss, basalt, porphyry, and small pebbles thereof. The sand that may be used may be of any quality or of any size in the range specified above, preferably having a diameter of about 1 mm. or less. Graded sand of medium particle size such as "Ottawa" sand and "Best" sand or a mixture of the two may be used to better advantage. Ottawa sand is a silica sand of the type referred to as "round". Best sand is of the type known as "sharp". In both cases, fines will have been removed. In general, however, the sieve size of the sand may vary over a fairly wide range. In lieu of or in addition to sand, it is possible to use fractured colored glass marbles, ground glass, silica flour, emery powder, ground slag, and fine gravel.

The proportion of the liquid monomer, DCPE(M)A, employed may vary widely depending upon the porosity and surface area of the aggregate to be bound together. For example, the amount of DCPE(M)A may be from about 2% by weight to 40% by weight or more of the total weight of aggregate material used in the compositions. The resulting composition can be shaped into any form desired. The addition of a polyvalent metal salt drier, preferably with an organic peroxide, in small amounts, can be made to the mixture just before molding. The proportion of drier added to the composition before molding may be from about 0.0005 weight percent up to about 2 weight percent, and the amount of peroxide may be in the range of 0.1 to 3 weight percent, based on the weight of the DCPE(M)A.

The drier and/or peroxide may be kept in a separate package and shipped separately to the site of operations where the composition of the present invention is to be molded, as by pouring or trowelling to lay or patch a concrete floor or base or pavement. The metal salt drier or peroxide is preferably mixed into the DCPE(M)A/aggregate mixture shortly before the casting or molding of the mixture in the form desired.

The composition may be colored by the choice of a colored aggregate or by including within the aggregate or within the composition a suitable amount of pigment or dye dissolved in the DCPE(M)A. The amount of such pigment or dye may vary from about 1% to 20% by weight of the composition.

By the term "drier" herein is meant a siccative, that is, by "drier" is meant any polyvalent metal-containing salt that catalyzes the oxidative curing of drying oils and, when added to oil-based varnishes and paints, hastens the drying or curing thereof. Such substances include the polyvalent metal salts of higher aliphatic acids, such as the butyrate, pentanoate, hexanoate, and especially the salt of higher aliphatic acids having from 8 to 30 carbon atoms or of naphthenic acids that provide solubility in the DCPE(M)A. Generally, the most useful drier salts for the DCPE(M)A compositions of the present invention are salts of naphthenic acids or of ($C_8$ to $C_{30}$) aliphatic acids. Examples of the polyvalent metal include calcium, copper$^{II}$, zinc$^{II}$, manganese$^{II}$, manganese$^{III}$, lead$^{II}$, cobalt$^{II}$, cobalt$^{III}$, iron$^{III}$, vanadium$^{II}$, and zirconium$^{IV}$. These salts also accelerate the action of the organic peroxide or hydroperoxide when component (c) is also present. Other examples of the acid component or anion of the drier salt are those resinic acids, (that is, rosin acids), tall oil fatty acids, linseed oil fatty acids, 2-ethylhexanoic acid, lauric acid, palmitic acid, myristic acid, stearic acid, oleic acid, linoleic acid, linolenic acid, behenic acid, cerotic acid, montanic acid, and abietic acid. A mixture of drier salts may be used.

Preferred drier salts are those of cobalt and manganese, such as cobalt octoate, cobalt naphthenate, cobalt acetylacetonate and manganese octoate, manganese naphthenate, and manganese acetylacetonate.

Aromatic amines may be used in small amounts with the drier salts and generally accelerate the action of the peroxide. For example, aniline, N,N-dimethylaniline, N,N-diethylaniline, toluidine, N,N-di(hydroxyethyl)-toluidine, may be added for this purpose in an amount of 0.1 to 2 percent by weight of the DCPE(M)A.

The organic peroxides that may be used include not only the peroxides per se but also the hydroperoxides derived from hydrocarbons which contain from about 3 to 18 carbon atoms so that they are soluble in the DCPE(M)A. Suitable organic hydroperoxides include tertiary-butylhydroperoxide, cumene hydroperoxide, methylethylketone hydroperoxide and diisopropylbenzene hydroperoxide, and suitable peroxides include benzoyl peroxide, tertiary-butylperbenzoate, 2,2-bis-(tert-butylperoxy)-butane, bis-(1-hydroxy-cyclohexyl)-butane, bis-(1-hydroxy-cyclohexyl)-peroxide, and tert-butylperoxy-isopropyl carbonate.

The formation of the composition by molding may be accomplished in any desired way. For example, the mixture comprising the DCPE(M)A, aggregate, drier, and peroxide may be poured into suitable molds as in the casting of concrete floors or pavements or in the casting of cements that may later be used as wall or ceiling tiles or panels. When using it for this purpose or for repairing or patching worn or damaged floors, patios or parking lot bases, or concrete road pavements on highways and bridge decks, the mixture of DCPE(M)A and aggregate may be so proportioned as to provide a trowellable composition to lay relatively thin layers, from 1/16 to ½ inch thick. If additional viscosity is needed in such compositions to facilitate trowelling or other forming actions, a thickening agent or rheological control agent may be included.

The formation may be accomplished at ambient temperature. In any event, the composition with which the present invention is concerned may be completely free of volatile substances so that shrinkage that is difficult to control when other compositions having volatile components are used is avoided.

The use of both organic peroxide and polyvalent metal salt drier serves to insure the curing of the formed PC to a solid state in a relatively short time, such as from 5 to 30 minutes. However, curing of the surface may require additional drying time such as up to 24 hours or so to overcome tackiness because of the inhibition of polymerization of the DCPE(M)A by free radical action occurring at the air/surface interface. This initial tackiness may be overcome more rapidly by coating of the exposed surface(s) shortly after initial hardening of the composition with a free radical initiator contained in a suitable immiscible liquid that will exclude air from the surface after application thereof thereto.

The compositions described hereinabove are generally hard and tough when cured. When it is desired to render such compositions more flexible, a small proportion of a drying oil, such as linseed oil, or of an acrylic polymer having a low second order transition temperature ($T_g$), such as poly(ethylacrylate), poly(butylacrylate), or poly(2-ethylhexylacrylate), or of a mixture of a drying oil and low $T_g$ acrylic polymer, may be added to the composition and may replace part of the DCPE(M)A component (b). Alternatively, the DCPE(M)A may be used with a small proportion of an auxiliary liquid monomeric acrylic and/or vinyl ester binder forming material which is of low volatility and can reduce the hardness and impart a more flexible or resilient character to the final composition. A mixture of a drying oil and an auxiliary monomer may also be used. Such other acrylic ester monomers include ($C_{12}$–$C_{30}$)-alkyl or ($C_{12}$–$C_{30}$)-alkenyl acrylates or methacrylates such as lauryl acrylate, myristyl acrylate, palmityl acrylate, oleyl acrylate, linoleyl acrylate, linolenyl acrylate, stearyl acrylate; similar improvements in flexibility may be obtained by including with the DCPE(M)A long chain ($C_{12}$–$C_{30}$) aliphatic acid vinyl esters, e.g., vinyl laurate, vinyl oleate, vinyl stearate or di($C_4$–$C_8$) alkyl esters of maleic acid, fumaric acid, or itaconic acid, e.g., the dibutyl, dihexyl, or dioctyl fumarate, maleate, or itaconate, the DCPE(M)A may also be used with small proportions of multi-functional, i.e., polyethylenically unsaturated, monomers such as polyol poly(meth)acrylate, such as ethylene glycol diacrylate or dimethacrylate, trimethylolpropane triacrylate or trimethacrylate, etc. All of these monomeric materials have low volatility and are polymerizable by the action of the peroxide and the metal salt drier to form products having greater toughness and resistance to water, organic solvents, acids, and alkali. The proportion of these auxiliary monomers, if used, may be from about ½ percent to 25% by weight of the DCPE(M)A component, but preferably is not over about 15% by weight of such component.

The PC of the present invention is especially useful in the laying (and especially patching) of acid-, alkali-, and salt-resistant as well as organic solvent-resistant industrial flooring, basement flooring, pavements, roads, and bridges, and ship decks or floors. In all such structures, the cured product is resistant to water, organic solvents, such as gasoline, and highly corrosive media such as acids, salts, and alkalis.

In the following examples illustrating the invention, the parts and percentages are by weight and the temperatures are in Celsius or Centigrade degrees unless otherwise stated. The mesh size given for the aggregate used is based on the standard U.S. wire screen.

EXAMPLE 1

A polymer concrete (PC) is prepared by mixing the following ingredients in the order listed:

|  | Parts |
| --- | --- |
| Aggregate | |
| (1) #45 Mesh Sand | 35.0 |
| (2) #2 Mesh Sand | 35.0 |
| (3) Silica flour-120 microns | 15.0 |
| Liquid Monomer | |
| (4) DCPEMA | 14.62 |
| Curing Catalyst | |
| (5) Cumene hydroperoxide | 0.292 |
| (6) Cobalt naphthenate (6% $Co^{II}$) | 0.088 |
| Total | 100.00 |

The aggregate (1), (2) and (3) is rapidly wetted by the monomer (4) so that thorough mixing of these first four ingredients is completed in a few minutes. Then either item (5) or item (6) is mixed into the resulting slurry, and this is followed by mixing in of the remaining item (6) or (5). The resulting composition has a pot life of about 1.5 hours and a wet density of 2.04 g./cc. It is readily spread with a trowel as a thin layer on separate substrates of concrete (conventional hydraulic cement/sand/lime mix) and of wood (pine board). Excellent thin section (1/6 to ⅛ inch thickness) toughness is obtained on both substrates and the volume shrinkage on curing is about 3.6%. The cured PC exhibits: Shear Bond Adhesion greater than 700 pounds per square inch (psi) before cohesive failure occurs in the concrete-substrate; a flexural strength of 2,434 psi by ASTM C-348-72 and a flexural modulus of 2,424,513 psi.

This composition is easily trowellable to give a smooth feather-edge finish suitable as a flooring underlayment or as the normal wearing surface. This composition is applied by trowel to damaged and severely worn areas of a concrete floor to cover and repair those areas, feathering the PC at the borders of the areas to make the repair surfaces practically flush with the surface of surrounding areas. The cured patches show good adhesion to the sublayer of concrete.

As a two-package patching composition, one package may contain a mixture of items (1), (2), (3), and the catalyst system (5) and (6) and the other may contain the liquid monomer (4).

EXAMPLE 2

A PC is prepared in the same way as in Example 1 by mixing the following ingredients in the order listed:

|  | Parts |
| --- | --- |
| Aggregate | |
| (1) Sand (45-mesh) | 700 |
| (2) Silica flour (120 microns) | 150 |
| Liquid Monomer | |
| (3) DCPEA | 150 |
| Curing Catalyst | |
| (4) Cumene hydroperoxide | 3.0 |
| (5) Cobalt naphthenate (6% $Co^{II}$) | 0.9 |

The resulting composition has a wet density of 1.982 g./cc. The thin-section toughness (1/6" and ¼" respectively on concrete and wood (pine board) substrates) is excellent as in Example 1.

We claim:

1. A polymer concrete composition comprising an essentially anhydrous slurry of (a) an inert inorganic particulate aggregate having a void fraction of less than 0.37 in (b) dicyclopentenyloxyethyl acrylate or dicyclopentenyloxyethyl methacrylate or a mixture thereof, the slurry containing dissolved therein a curing catalyst consisting essentially of (c) an organic peroxide and/or (d) a polyvalent metal salt drier, the proportion of component (b) being such as to make the composition of workable, especially trowellable, consistency, the amount of (c) when present, being in the range of about 0.1 to 3 weight percent, and the amount of (d) when present, being in the range of about 0.0005 to about 2 weight percent, the ranges of (c) and (d) both being based on the weight of component (b).

2. A composition according to claim 1 wherein the aggregate material may range in size from about 100 microns to about 2-mesh, the latter measure being based on the standard U.S. wire screen dimension.

3. A composition according to claim 1 wherein component (c) is a peroxide or a hydroperoxide derived from a hydrocarbon having 3 to 18 carbon atoms.

4. A composition according to claim 1 wherein component (d) is a polyvalent metal salt of an aliphatic acid having 8 to 30 carbon atoms or of a naphthenic acid.

5. A composition according to claim 3 or claim 4 wherein component (c) is cumene hydroperoxide and component (d) is cobalt naphthenate.

6. A two-package article of commerce adapted to be stored, transported to the site of use, and the contents of the two packages thereof to be mixed to form the polymer concrete slurry of claim 1, one of the packages containing the aggregate (a) and the curing catalyst component (c) and/or (d), the other containing the liquid monomer component (b).

7. A method of patching worn or damaged areas of a concrete floor, base, or pavement on a highway or bridge-deck which comprises spreading a slurry according to claim 1 containing components (a), (b), (c), and (d) on the areas needing repair, smoothing the surface applied slurry to be approximately flush with the adjacent unpatched areas, letting the patches cure at ambient conditions, optionally applying to the exposed surfaces of the patched areas a thin coating of a drier (d) during the setting or curing thereof.

8. A polymer concrete product obtained by the curing while exposed to air at ambient temperature, of a formed mass of the composition according to claim 1.

9. A product obtained by the process of claim 7.

* * * * *